(12) United States Patent
Lindoff et al.

(10) Patent No.: US 8,886,193 B2
(45) Date of Patent: Nov. 11, 2014

(54) STORING OF NEIGHBOUR CELL INFORMATION FOR RAPID RECOVERY IN CASE OF HANDOVER FAILURE

(75) Inventors: Bengt Lindoff, Bjärred (SE); Konstantinos Dimou, Stockholm (SE); Walter Muller, Upplands Väsby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 73 days.

(21) Appl. No.: 13/696,190

(22) PCT Filed: Apr. 1, 2011

(86) PCT No.: PCT/EP2011/055105
§ 371 (c)(1),
(2), (4) Date: Nov. 5, 2012

(87) PCT Pub. No.: WO2011/141231
PCT Pub. Date: Nov. 17, 2011

(65) Prior Publication Data
US 2013/0059587 A1 Mar. 7, 2013

Related U.S. Application Data

(60) Provisional application No. 61/349,327, filed on May 28, 2010.

(30) Foreign Application Priority Data

May 11, 2010 (EP) .................................... 10162599

(51) Int. Cl.
*H04W 36/00* (2009.01)
*H04W 4/00* (2009.01)

(52) U.S. Cl.
CPC ...... *H04W 36/0072* (2013.01); *H04W 36/0083* (2013.01)
USPC .......................................... 455/436; 370/331

(58) Field of Classification Search
CPC .............................. H04W 36/16; H04W 36/24
USPC .......................................... 455/336; 370/331
See application file for complete search history.

(56) References Cited

U.S. PATENT DOCUMENTS

2001/0055969 A1* 12/2001 Bonta et al. .................. 455/436
2002/0193113 A1* 12/2002 Sayeedi et al. ................ 455/439

(Continued)

FOREIGN PATENT DOCUMENTS

WO 2009048754 A2 4/2009

OTHER PUBLICATIONS

3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 9); 3GPP TS 36.300 V9.2.0, Dec. 2012, pp. 43-44; 49-53.

(Continued)

*Primary Examiner* — Christopher M Brandt
(74) *Attorney, Agent, or Firm* — Murphy, Bilak & Homiller, PLLC

(57) ABSTRACT

This disclosure teaches a method and apparatus for radio link failure recovery by a User Equipment (UE). The example UE includes one or more controllers that are configured to store cell access information for a target cell that is the target for an impending handover from a serving cell, and for a backup cell that is selected by the UE from among a set of neighboring cells that includes the target cell. Advantageously, in case the handover to the target cell fails, the one or more controllers are configured to retrieve the cell access information stored for the backup cell and to use that information for re-establishing connection in the backup cell. The UE selects the backup cell, for example, as the neighboring cell other than the target cell having the strongest signal conditions with respect to the UE.

21 Claims, 2 Drawing Sheets

(56) References Cited

U.S. PATENT DOCUMENTS

2004/0166865 A1* 8/2004 Soong et al. .................. 455/450
2006/0258386 A1* 11/2006 Jeong et al. .................. 455/525
2009/0149180 A1* 6/2009 Kitazoe ......................... 455/436
2011/0124340 A1* 5/2011 Puttonen et al. ............. 455/437
2013/0051214 A1* 2/2013 Fong et al. .................... 370/216

OTHER PUBLICATIONS

NTT DoCoMo, Inc. "Summary of email discussion on handover failure handling," 3GPP TSG RAN WG2 #61, Tdoc-R2-081161, Sorrento, Italy, Feb. 15, 2008.

* cited by examiner

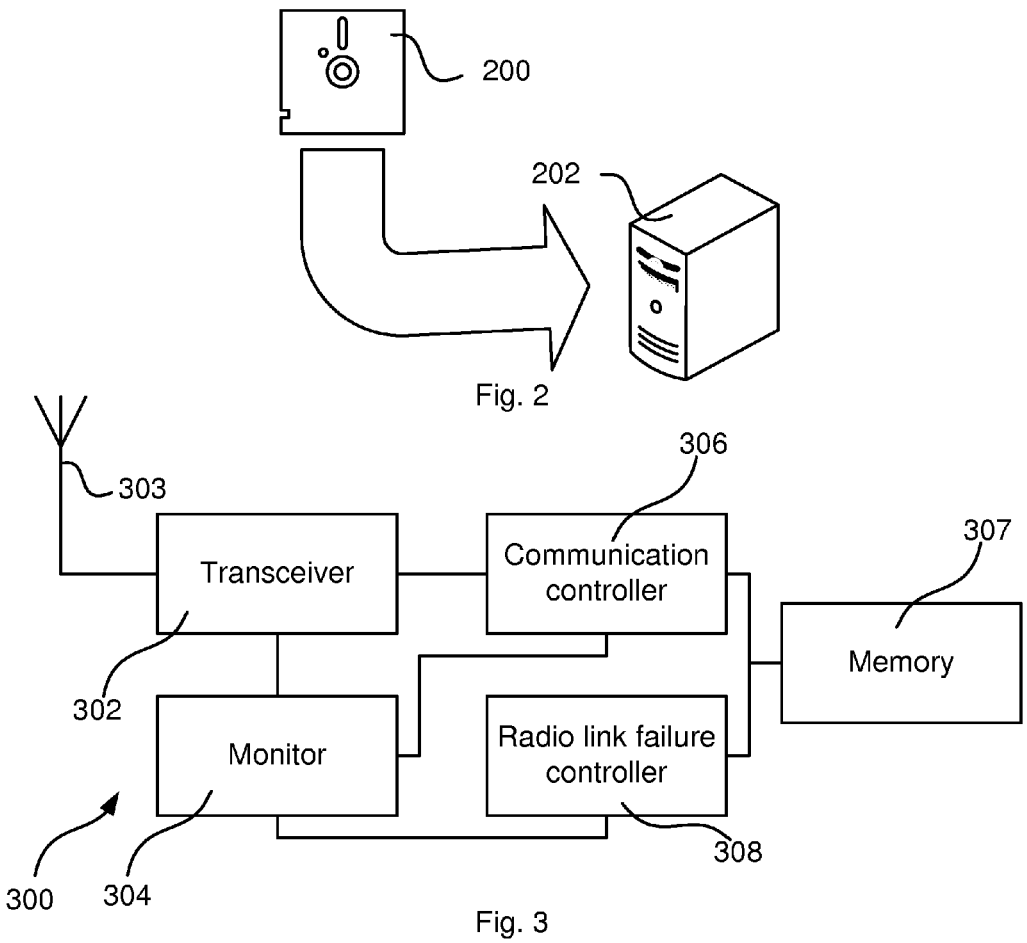
Fig. 2
Fig. 3
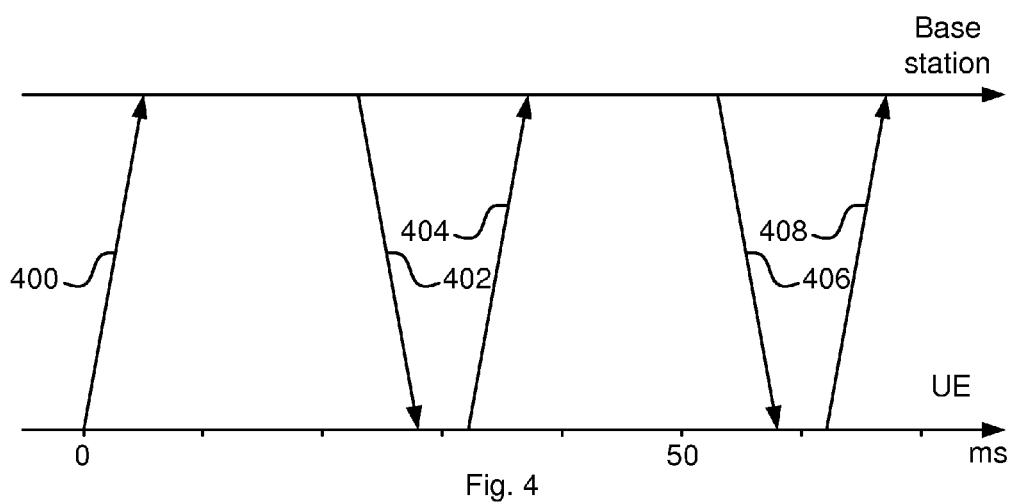
Fig. 4

STORING OF NEIGHBOUR CELL INFORMATION FOR RAPID RECOVERY IN CASE OF HANDOVER FAILURE

TECHNICAL FIELD

The present invention generally relates to a method of radio link failure recovery for a user equipment device working in a cellular telecommunication network, to such a user equipment device, and to a radio link failure recovery controller for such a user equipment device. The present invention also relates to a computer program for implementing such a method.

BACKGROUND

For cellular telecommunication network with a base station of each cell, for example a 3GPP LTE network, radio link failure (RLF) performance as well as handover performance is evaluated in challenging mobility scenarios. In particular, scenarios where handover failures occur, i.e. the handover signalling is not transmitted with the desired success rate, is a cumbersome task. A challenging scenario involving users moving at high speed is the so called "high speed train scenario". This scenario involves users travelling with a speed of 350 km/h in heavily loaded networks consisting of large cells. Another challenging scenario involves effects related to micro cells in urban areas. One of the most serious problems in this case is the corner effect in which a user equipment device could experience a sudden drop of signal level up to 20 dB per meter due to loss of line-of-sight communication when it turns around the corner. Particularly the 3GPP LTE imposes high requirement on the handover performance, thus, it is of significance to find feasible solutions to combat the corner effect. The specification 36.331 of 3GPP discloses handover between eNodeBs and from an eNodeB to another radio access technology. Also other similar telecommunication systems face the same problem. Furthermore, the number of handovers will increase due to the smaller size of microcells.

The specification 3GPP TS 36.300, version 9.2.0 Release 9 discloses in its section 10.1.6 behaviour associated to radio link failure (RLF), such as for handover failure. Activity is there described to be resumed by means of explicit signalling between UE and eNodeB, or connection is released and the UE initiates procedure to establish new connection.

WO 2009/048754 discloses neighbour list update for inter radio access technology (IRAT) transition. To facilitate IRAT handover, measurement control information such as neighbour list information is retrieved by the UE from the network.

"Summary of email discussion on handover failure handling" submitted to 3GPP TSG RAN WG2 #61 in Sorrento, February 2008, by NTT DoCoMo Inc. discusses approaches for RLF recovery and whether RLF recovery should be considered as RLF at target cell or at source cell at handover failure.

In such scenarios, where the signal environment may change quickly, and the normal process for performing handover, maybe for a multitude of users more or less simultaneously, may not be sufficient. It is therefore a desire to improve performance in such situations.

SUMMARY

An object of the invention is to at least alleviate the above stated problem. The present invention is based on the understanding that radio link failure, e.g. under harsh conditions with fast moving user equipment, or when loosing line-of-sight in small cells in areas with obstacles, needs to be handled to avoid loss of communication. The inventors have found that combating the problem by fast re-establishment of connection with the network is a feasible way.

According to a first aspect, there is provided a method of radio link failure recovery for a user equipment, UE, device working in a cellular telecommunication network where base station of each cell periodically transmits a broadcast message including information related to needs of a UE to enable to connect to that cell. The method comprises measuring signal conditions for serving cell and neighbouring cells. Upon hand over event being triggered from measured signal conditions, the method comprises sending a handover measurement report, and storing information, for a target cell to which the UE will handover to and at least for one of the neighbouring cells, related to UE needs to enable to connect to the cell. This "at least one" neighbouring cell may be referred to as a "backup" cell and such information is also referred to as "cell access information" herein. If handover procedure fails, the method comprises retrieving the stored cell access information for the backup cell, such that the information needed by the UE for connecting to the backup cell is acquired and re-establishing connection with the cellular telecommunication network via the backup cell using the retrieved cell access information.

The information for storing may comprise information about random access channel including synchronisation information for the at least one of the neighbouring cells. The random access channel information may also include transmission signatures to use, time slots to transmit the random access channel, etc.

The storing of the information related to UE needs to enable to connect to that cell may comprise retrieving a master information block, MIB, which may comprise at least one of information about Physical Hybrid Automatic Repeat Request Indicator Channel, PHICH, configuration and system frame number such that signalling on Physical Downlink Control Channel, PDCCH, is enabled to be retrieved such that information provided in system information blocks, SIBs, is enabled to be retrieved such that the retrieved information related to UE needs to enable to connect to that cell is enabled to be stored.

The measuring of the signal conditions for serving cell and neighbouring cells may comprise making cell search and determining Reference Signal Received Power, RSRP, and/or Reference Signal Received Quality, RSRQ, for respective cells.

An amount of information to be stored when storing the information may be determined based on provided quality of service.

The storing of the information may be performed in a Random Access Memory, RAM.

The at least one of the neighbouring cells for which information related to UE needs to enable to connect to the neighbouring cell may comprise the neighbouring cell or cells of the at least one of the neighbouring cells having the strongest measured signal conditions.

According to a second aspect, there is provided a user equipment, UE, device suitable for working in a cellular telecommunication network where base station of each cell periodically transmits a broadcast message including information related to UE needs to enable to connect to that cell. The UE comprises a transceiver arranged to receive signals from and transmit signals to at least one of the base stations in vicinity of the UE device when in use, a monitor arranged to measure signal conditions for serving cell and neighbouring cells based on signals received by the transceiver, a communication controller arranged to, upon a handover event being triggered from measured signal conditions by the communication controller, send a hand over measurement report by the transceiver, and storing information, for a target cell to which the UE will handover to and at least for one of the neighbouring cells, related to UE needs to enable to connect to the cell in a memory, and a radio link failure recovery controller arranged to, if handover procedure fails, retrieve the stored information for the one of the neighbouring cells such that information related to UE needs to enable to connect to the neighbouring cell is acquired from the memory and re-establishing connection with the cellular telecommunication network using the acquired information by the transceiver.

The information for storing may comprise information about random access channel including synchronisation information for the at least one of the neighbouring cells.

The communication controller may further be arranged to, upon the storing of the information related to UE needs to enable to connect to that cell, retrieve a master information block, MIB, which comprises at least one of information about Physical Hybrid Automatic Repeat Request Indicator Channel, PHICH, configuration and system frame number. This enables signalling on Physical Downlink Control Channel, PDCCH, to be retrieved, which in turn enables information provided in system information blocks, SIBs, to be retrieved, which in turn enables the retrieved information, related to UE needs to enable to connect to that cell, to be stored.

The monitor may be arranged to determine Reference Signal Received Power, RSRP, and/or Reference Signal Received Quality, RSRQ, for respective cells and comprises a cell searcher arranged to make cell search.

The communication controller may be arranged to determine an amount of information to be stored when storing the information based on provided quality of service.

The memory may be a Random Access Memory, RAM.

According to a third aspect, there is provided a computer program comprising computer program code comprising instructions to cause a processor on which the computer program code is executed to perform the method according to the first aspect.

According to a fourth aspect, there is provided a radio link failure recovery controller for a user equipment, UE, device suitable for working in a cellular telecommunication network where base station of each cell periodically transmits a broadcast message including information related to UE needs to enable to connect to that cell, comprising means for performing the method according to the first aspect.

In the field, the expression "serving cell" is well recognised as a state of a UE that has completed cell selection/reselection process and has chosen a cell, served by a base station, from which it receives available services, i.e. the serving cell. Further, the expression "neighbouring cells" means cells in vicinity of the serving cell, wherein a UE connected to the serving cell is able to detect transmissions from the neighbouring cells. The term "UE needs to enable to connect to the cell" means information about e.g. frequency, synchronisation, signalling structure and timing, etc. that is needed to establish operative communication between the UE and a base station of the cell. These parameters are provided according to the structure of specifications of the cellular telecommunication system, but may not be available instantly since some of the information is provided periodically with a relatively long period in sense of abrupt changes in signal environment, such as rounding corners of obstacles, e.g. buildings, or when the UE is moving very fast. An advantage of embodiments of the invention is that radio link failure in such conditions can be recovered fast enough not to drop communication, e.g. a telephone call. Another advantage of embodiments of the invention is that less energy is spent on re-establishing communication with the cellular network from "zero", which provides for less battery consumption.

Popularly speaking, the UE makes a precautious action when it is aware of a handover event by, in addition to collecting information about the target cell to which the UE will make the handover also collect information about one or a few of the other neighbouring cells having promising signal figures. If the handover fails, the stored information about the promising other cells provides a safety net by enabling possibilities for faster RLF recovery, and communication sessions may be kept alive.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 2 schematically illustrates a computer readable medium comprising a computer program to be loaded into a processing device.

FIG. 3 is a block diagram schematically illustrating elements of particular interest for this disclosure of a user equipment device, and among those elements a radio link failure controller.

FIG. 4 schematically illustrates a timing diagram for an example of a procedure for preparing handover.

DETAILED DESCRIPTION OF PREFERRED EMBODIMENTS

Figure 1:
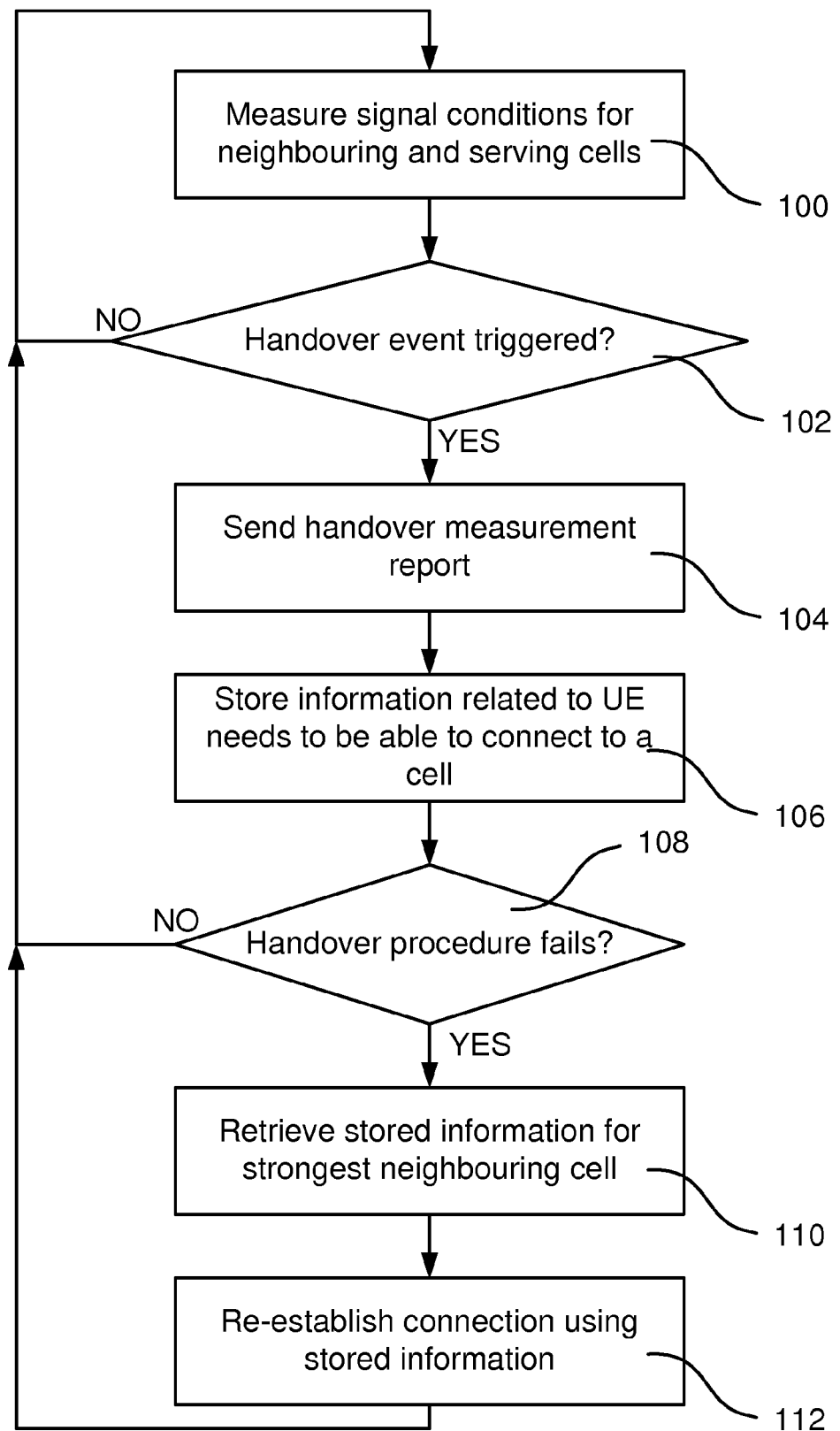
FIG. 1 is a flow chart schematically illustrating a method according to an embodiment.

In the field, the expression "serving cell" is well recognised as a state of a UE that has completed cell selection/reselection process and has chosen a cell, served by a base station, from which it receives available services, i.e. the serving cell. Further, the expression "neighbouring cells" means cells in vicinity of the serving cell, wherein a user equipment, UE, being in connection with the serving cell is able to detect transmissions from the neighbouring cells. Here, the term "target cell" is the cell the UE will handover to. The target cell is the cell to which a handover request message is transmitted from the serving cell. Typically, this is the cell the UE has indicated as the strongest cell. The neighbouring cells thus comprises the target cell and one or more other cells, which may have promising transmission figures, as will be described below, which can be used as backup or safety if the handover to the target cell fails.

Handover performance as well as radio link failure, RLF, performance in the case of a fast moving UE, e.g. a so-called the high speed train scenario, are considered. Roughly speaking, in these cases of high speed train scenario, whenever RLF during handover occurs, RLF recovery procedure is initiated almost always in the target cell and the procedure is always successful. In the case of high speed train scenario, failures upon transmission of handover signalling can go to values higher than 7.5% in the case of web traffic and up to 12.5% for Voice over Internet Protocol, VoIP, traffic. In both cases, RLF recovery procedure is almost always successful. RLF recovery procedure is initiated approximately 75% of the times in the target cell. The rest of the times, RLF procedure is initiated in either the serving or another third cell. 65% of the users will experience interruption shorter than 500 ms, and 90% of the users will have interruption shorter than 600 ms. This interruption time is acceptable for web services, and no TCP congestion is expected to be generated. Preparing the target cell and one additional cell would be more than sufficient, even in this case UEs are moving at extremely high speeds of 350 km/h, such as in the high speed train scenario.

Macro cells are deployed to provide the main coverage of a radio network, especially in rural areas and highways. However, with urbanizations, many cities expanded considerably. Such expansions are characterized by denser man-made structures, larger populations, higher volume of traffic and etc. Furthermore, hot spots such as airports and train stations also impose much higher demand on network capacity. Under such circumstances, macro cells no longer provide optimal solutions, since higher capacity is desired due to the increased number of mobile users. Manhattan is a perfect example for such a situation. Consequently, the use of micro cells was proposed to increase the network capacity in urban areas and hot spots. Unfortunately, the mobility management in this situation becomes much more difficult because of the side effects coming with micro cells in urban areas, such as corner effect. In order to investigate the radio network performances in downtown areas like Manhattan, a simple model consisting of rectangular blocks representing buildings with streets in between is often used, and called the Manhattan scenario. One of the most serious problems in this case is the corner effect in which a mobile user could experience a sudden drop of signal level up to 20 dB due to loss of Line-of-Sight (LOS) communication when it turns around the corner. The 3GPP LTE imposes high requirement on the handover performance, thus, it is of significance to find feasible solutions to combat the corner effect. Furthermore, the number of handovers will increase due to the smaller size of micro-cells. Thus, the Manhattan scenario is also considered.

FIG. 1 is a flow chart schematically illustrating a method radio link failure recovery for a user equipment, UE, device. The UE device is suitable for working in a cellular telecommunication network with a base station of each cell, for example a 3GPP LTE network. Signal conditions for serving cell and neighbouring cells are measured 100. Signal conditions can be Reference Signal Received Power, RSRP, and/or Reference Signal Received Quality, RSRQ, or measures such as signal-to-noise ratio, SNR, signal-to-interference ratio, SIR. The determining of signal conditions also comprises cell searching to enable measuring the adequate signals on new detected neighbouring cells. Signal conditions for respective cell are measured such that the conditions can be mutually compared, e.g. for making decision on handover. If such a handover event is triggered 102, a handover measurement report is sent 104 to the network, for example as described below, and if no handover event is triggered 102, the procedure returns and proceeds with measuring 100 signal conditions.

For example in the case of 3GPP LTE, there is a certain procedure of negotiation and sending 104 of the measurement report. FIG. 4 schematically illustrates a timing diagram for an example of the procedure. First, there is sending of an initial measurement report request 400 to the base station of the serving cell, then, normally after about 10 to 30 ms, but minimum 4 ms, reception of an initial scheduling grant 402 from the base station of the serving cell is possible. After reception of the initial scheduling grant 402, the UE sends, after 4 ms, a buffer size transmission request 404 to the base station of the serving cell. Then, normally after about 10 to 30 ms, but minimum 4 ms, reception of an allocation scheduling grant 406 from the base station of the serving cell for the requested size of transmission is possible. The UE can then, after 4 ms, send a measurement report 408 such that the cellular telecommunication network is enabled to make a hand over decision for the UE. Summing up the delays, we can see that in a fast changing signal environment the handover may start too late if waiting to the normal scheduled instant and a radio link failure would occur, which in case of for example a VoIP service would be experience as an interrupted call.

Returning to FIG. 1, in addition to sending 104 the measurement report, information related to UE needs is stored 106. The information is related to information provided on a Broadcast Channel, BCH, from the neighbouring cells, respectively, to which the UE is enabled to listen. Thus, BCH information for the target cell, mostly the strongest neighbouring cell, can be stored. The information for storing can comprise information about random access channel including synchronisation information for at least one of the neighbouring cells, e.g. the one having strongest measured signal condition, and maybe also for the second and/or third strongest, etc. The random access channel information can also include transmission signatures to use, time slots to transmit the random access channel, etc. The information related to UE needs is such information that enables the UE to connect to a cell and can comprise retrieving a master information block, MIB, which comprises information about Physical Hybrid Automatic Repeat Request Indicator Channel, PHICH, configuration and system frame number such that signalling on Physical Downlink Control Channel, PDCCH. This information can preferably be retrieved such that information provided in system information blocks, SIBs, can be retrieved. From this the retrieved information for one or more promising cells related to UE needs to enable to connect to the one or more cells can be stored. The amount of information to be stored can be determined based on provided quality of service, i.e. be optimised in view of the provided service such as prioritising speed of recovery for services such as VoIP and prioritising overall bandwidth for web traffic.

As it is beneficial that recovery is fast, it is preferable that the stored information is fast retrievable. Therefore, the storing 106 of the information can be made in a Random Access Memory, preferably with short access time. Cost, space and energy consumption of such memory implies design of the UE. Therefore, it is beneficial to choose the right information and the right amount of information since the memory space in practice will be limited. Thus, although information on for example at least eight neighbouring cells is available, only information about one or a few of them is stored.

If the handover process fails 108, stored information can be retrieved 110. This can be done by determining a most promising neighbouring cell, i.e. the one of the neighbouring cells (that was not used as target cell in the failed handover) with the strongest signal conditions, and retrieving 110 information related to this, which was previously stored 106. If the handover process succeeds, the process returns and proceeds with measuring 100 signal conditions.

When the information related to UE needs has been retrieved 110 for the promising cell, which comprises information that enables the UE to camp on that cell, connection is re-established 112 by using the information and establishing communication with the network via the promising cell. Thus, the connection is re-established 112 and the radio link failure is recovered. Data packets that have not reached the UE can be provided via the new cell and can be received by the UE fast enough for enabling, experienced by the user, a communication that was never interrupted. This is particularly important for services such as VoIP or video calls.

The method according to the present invention is suitable for implementation with aid of processing means, such as computers and/or processors. Therefore, there is provided computer programs, comprising instructions arranged to cause the processing means, processor, or computer to perform the steps of any of embodiments of the method described with reference to FIG. 1. The computer programs preferably comprises program code which is stored on a computer readable medium 200, as illustrated in FIG. 2, which can be loaded and executed by a processing means, processor, or computer 202 to cause it to perform the methods, respectively, according to embodiments of the present invention, preferably as any of the embodiments described with reference to FIG. 1. The computer 202 and computer program product 200 can be arranged to execute the program code sequentially where actions of the any of the methods are performed stepwise. The processing means, processor, or computer 202 is preferably what normally is referred to as an embedded system. Thus, the depicted computer readable medium 200 and computer 202 in FIG. 2 should be construed to be for illustrative purposes only to provide understanding of the principle, and not to be construed as any direct illustration of the elements.

FIG. 3 is a block diagram schematically illustrating elements of particular interest for this disclosure of a user equipment, UE, device 300. The UE device can comprise a multitude of other elements, such as a user interface, audio circuitry, input and output interfaces for interacting with other equipment, etc. However, as these elements are not involved in the particulars of the invention disclosed herein, they have been omitted not to obscure the relevant parts as the skilled person would readily know how to add such elements for making a UE device.

The UE device 300 is suitable for working in a cellular telecommunication network with a base station of each cell, e.g. a 3GPP LTE telecommunication network. The UE 300 comprises a transceiver 302 arranged to receive signals from and transmit signals to at least one of the base stations in vicinity of the UE device 300, e.g. via an antenna or antenna system 303, when used in the telecommunication network. The transceiver is connected to a monitor 304 such that the monitor 304 can be provided with received signals or signals processed therefrom. The monitor 304 is arranged to measure signal conditions for serving cell and neighbouring cells based on signals received by the transceiver 302. The monitor 304 can be integrated in the transceiver 302, or be a separate element, i.e. a separate chip.

A communication controller 306 is connected to the receiver 302, the monitor 304, and a radio link failure controller 308 such that it can be arranged to perform the approach which has been demonstrated above for the method. The communication controller 306 is preferably implemented as a processor or signal processor and arranged to handle signalling via the transceiver 302, such as provision of handover measurement reports and handover procedures. The monitor 304 and/or the memory 307 and/or the radio link failure controller 308 can be part of the communication controller 306.

The communication controller 306 receives information from the transceiver 302, the monitor 304, the memory 307, and the radio link failure controller 308, and also provides control signals to them. The radio link failure controller 308 is arranged to provide control signals to the other entities in a similar way, i.e. for providing the re-establishment of connection with the telecommunication network after a radio link failure as described above with reference to FIG. 1.

The monitor 304 can be arranged to determine Reference Signal Received Power, RSRP, and/or Reference Signal Received Quality, RSRQ, for the respective cells. The monitor also comprises a cell searcher arranged to make cell search such that measurements can be made on the relevant signals.

As it is beneficial that recovery is fast, it is preferable that the stored information is fast retrievable. Therefore, the memory 307 is preferably a Random Access Memory, more preferably with short access time. The memory 307 can also be a register or cache memory of the radio link failure controller 308 or the communication controller 306.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a User Equipment (UE) of radio link failure recovery comprising:
    selecting a backup cell from among a set of neighbouring cells that includes a target cell, wherein the backup cell is not the target cell and is to be used for reconnecting to a cellular telecommunication network in case an impending handover of the UE from a serving cell to the target cell fails;
    storing cell access information for the target and backup cells, said cell access information providing the UE with information needed for establishing a connection to the cellular telecommunication network in either the target cell or the backup cell; and
    if the handover to the target cell fails, using the stored cell access information to reestablish connection with the cellular telecommunication network in the backup cell.

2. The method of claim 1, wherein the cell access information comprises random access channel information, including synchronization information for the backup cell.

3. The method of claim 1, wherein storing the cell access information comprises storing a master information block (MIB) transmitted for the backup cell, where the MIB comprises at least one of: configuration information for a Physical Hybrid Automatic Repeat Request Indicator Channel (PHICH) in the backup cell; and configuration and system frame number information enabling the UE to receive signaling on a Physical Downlink Control Channel (PDCCH) in the backup cell, and thereby enabling the UE to retrieve information provided in system information blocks (SIBs) transmitted in the backup cell.

4. The method of claim 1, further comprising measuring signal conditions for the serving and neighbouring cells before and/or in conjunction with the handover being attempted from the serving cell to the target cell.

5. The method of claim 4, wherein measuring signal conditions includes performing cell searching with respect to the neighbouring cells and determining at least one of Reference Signal Received Power (RSRP) and Reference Signal Received Quality (RSRQ) for the neighbouring cells.

6. The method of claim 1, further comprising selecting the backup cell from among the neighbouring cells, not including the target cell, based on signal conditions measured by the UE for the neighbouring cells in advance of or in conjunction with the handover being attempted from the serving cell to the target cell.

7. The method of claim 1, further comprising determining an amount of cell access information to be stored, based on a provided quality of service.

8. The method of claim 1, further comprising storing the cell access information in a Random Access Memory (RAM) in the UE.

9. The method of claim 1, further comprising selecting the backup cell as the neighbouring cell other than the target cell having the strongest signal conditions with respect to the UE.

10. The method of claim 1, further comprising determining an amount of cell access information to store for the backup cell in dependence on the type of communication service being provided to the UE, where the amount of cell access information stored determines whether a recovery speed for the provided service is optimized or a bandwidth of the provided service is optimized.

11. A user equipment (UE) comprising:
a transceiver configured to receive signals from and transmit signals to one or more base stations in a cellular telecommunication network; and
one or more controllers operatively associated with the transceiver and configured to:
select a backup cell from among a set of neighbouring cells that includes a target cell, wherein the backup cell is not the target cell and is to be used for reconnecting to a cellular telecommunication network in case an impending handover of the UE from a serving cell to the target cell fails;
store cell access information for the target and backup cells, said cell access information providing the UE with information needed for establishing a connection to the cellular telecommunication network in either the target cell or the backup cell; and
if the handover to the target cell fails, use the stored cell access information to reestablish connection with the cellular telecommunication network in the backup cell.

12. The UE of claim 11, wherein the cell access information comprises random access channel information, including synchronization information for the backup cell.

13. The UE of claim 11, wherein the stored cell access information comprises a master information block (MIB) transmitted for the backup cell, where the MIB comprises at least one of: configuration information for a Physical Hybrid Automatic Repeat Request Indicator Channel (PHICH) in the backup cell; and configuration and system frame number information enabling the UE to receive signaling on a Physical Downlink Control Channel (PDCCH) in the backup cell, and thereby enabling the UE to retrieve information provided in system information blocks (SIBs) transmitted in the backup cell.

14. The UE of claim 11, further comprising a monitoring unit configured to measure signal conditions for the serving and neighbouring cells before and/or in conjunction with the handover being attempted from the serving cell to the target cell.

15. The UE of claim 14, wherein the UE is configured to perform cell searching with respect to the neighbouring cells and determine, via said monitoring unit, at least one of Reference Signal Received Power (RSRP) and Reference Signal Received Quality (RSRQ) for the neighbouring cells.

16. The UE of claim 11, wherein the one or more controllers are configured to select the backup cell from among the neighbouring cells, not including the target cell, based on signal conditions measured by the UE for the neighbouring cells in advance of or in conjunction with the handover being attempted from the serving cell to the target cell.

17. The UE of claim 11, wherein the one or more controllers are configured to determine an amount of cell access information to be stored, based on a provided quality of service.

18. The UE of claim 11, wherein the one or more controllers are configured to store the cell access information in a Random Access Memory (RAM) in the UE.

19. The UE of claim 11, wherein the one or more controllers are configured to select the backup cell as the neighbouring cell other than the target cell having the strongest signal conditions with respect to the UE.

20. The UE of claim 11, wherein the one or more controllers include a communication controller that is configured to send a handover measurement report to the cellular telecommunication network upon the handover being triggered, said handover measurement report including signal conditions measured by the UE for the serving and neighbouring cells, and is further configured to store the cell access information, and wherein the one or more controller include a radio link failure recovery controller that is configured to retrieve the stored cell access information for use in reestablishing the connection to the cellular telecommunication network in the backup cell.

21. The UE of claim 11, wherein the one or more controllers are configured to determine an amount of cell access information to store for the backup cell in dependence on the type of communication service being provided to the UE, where the amount of cell access information stored determines whether a recovery speed for the provided service is optimized or a bandwidth of the provided service is optimized.

* * * * *

UNITED STATES PATENT AND TRADEMARK OFFICE
CERTIFICATE OF CORRECTION

PATENT NO.        : 8,886,193 B2                                             Page 1 of 1
APPLICATION NO.   : 13/696190
DATED             : November 11, 2014
INVENTOR(S)       : Lindoff et al.

It is certified that error appears in the above-identified patent and that said Letters Patent is hereby corrected as shown below:

In the specification

In Column 7, Line 65, delete "receiver 302," and insert -- transceiver 302, -- therefor.

Signed and Sealed this
Fourteenth Day of June, 2016

Michelle K. Lee
*Director of the United States Patent and Trademark Office*